United States Patent
Hane et al.

(10) Patent No.: US 7,545,129 B2
(45) Date of Patent: Jun. 9, 2009

(54) SWITCHING POWER SUPPLY CIRCUIT

(75) Inventors: Norimasa Hane, Tokyo (JP); Takeshi Naka, Tokyo (JP)

(73) Assignees: Torex Semiconductor Ltd., Tokyo (JP); Device Engineering Co., Ltd., Tokyo (JP)

( * ) Notice: Subject to any disclaimer, the term of this patent is extended or adjusted under 35 U.S.C. 154(b) by 127 days.

(21) Appl. No.: 11/810,390

(22) Filed: Jun. 5, 2007

(65) Prior Publication Data

US 2008/0007235 A1    Jan. 10, 2008

(30) Foreign Application Priority Data

Jun. 5, 2006    (JP) .............................. 2006-156666

(51) Int. Cl.
*G05F 1/40* (2006.01)

(52) U.S. Cl. ...................................... 323/282; 323/285

(58) Field of Classification Search ................. 323/275, 323/276, 282, 283, 284, 285, 351
See application file for complete search history.

(56) References Cited

U.S. PATENT DOCUMENTS

| | | | | |
|---|---|---|---|---|
| 5,949,229 | A * | 9/1999 | Choi et al. .................. | 323/320 |
| 6,963,190 | B2 * | 11/2005 | Asanuma et al. ............. | 323/283 |
| 6,984,966 | B2 * | 1/2006 | Kubota et al. ................ | 323/282 |
| 7,038,436 | B2 * | 5/2006 | Goto et al. ................... | 323/282 |
| 7,109,693 | B2 * | 9/2006 | Yoshida et al. ............... | 323/282 |
| 7,321,222 | B2 * | 1/2008 | Hojo .......................... | 323/224 |

FOREIGN PATENT DOCUMENTS

JP    2005-033936 A    2/2005

\* cited by examiner

*Primary Examiner*—Adolf Berhane
(74) *Attorney, Agent, or Firm*—The Webb Law Firm (57) ABSTRACT

A switching power supply circuit comprises: current detection means for detecting a current flowing through an inductor; current holding means for holding the current flowing through the inductor over a past predetermined period; and current superposition means for adding to an output of an error amplifier a current superposition signal which makes an adjustment, based on a present current information signal as an output signal of the current detection means, such that the ON-period of a switching signal of a PWM comparator is shortened, and also makes an adjustment, based on a past current information signal as an output signal of the current holding means, such that the ON-period of the switching signal of the PWM comparator is lengthened.

8 Claims, 9 Drawing Sheets

Current ISW

FIG. 9B

Current Information Signal S11

FIG. 9C

Error Signal Verr
Error Signal Verr-r
Oscillation Signal RAMP

FIG. 9D

Switching Signal SWS

Ml US 7,545,129 B2
1
SWITCHING POWER SUPPLY CIRCUIT

The entire disclosure of Japanese Patent Application No. 2006-156666 filed Jun. 5, 2006 is expressly incorporated by reference herein.

BACKGROUND OF THE INVENTION

1. Field of the Invention

This invention relates to a switching power supply circuit and, more specifically, to a switching power supply circuit useful when detecting a current flowing in the circuit, and providing feedback on current information to obtain a predetermined output voltage.

2. Description of the Related Art

In a switching power supply circuit, a current feedback mode is in wide use for maintaining the stability of the switching power supply circuit.

Figure 8:
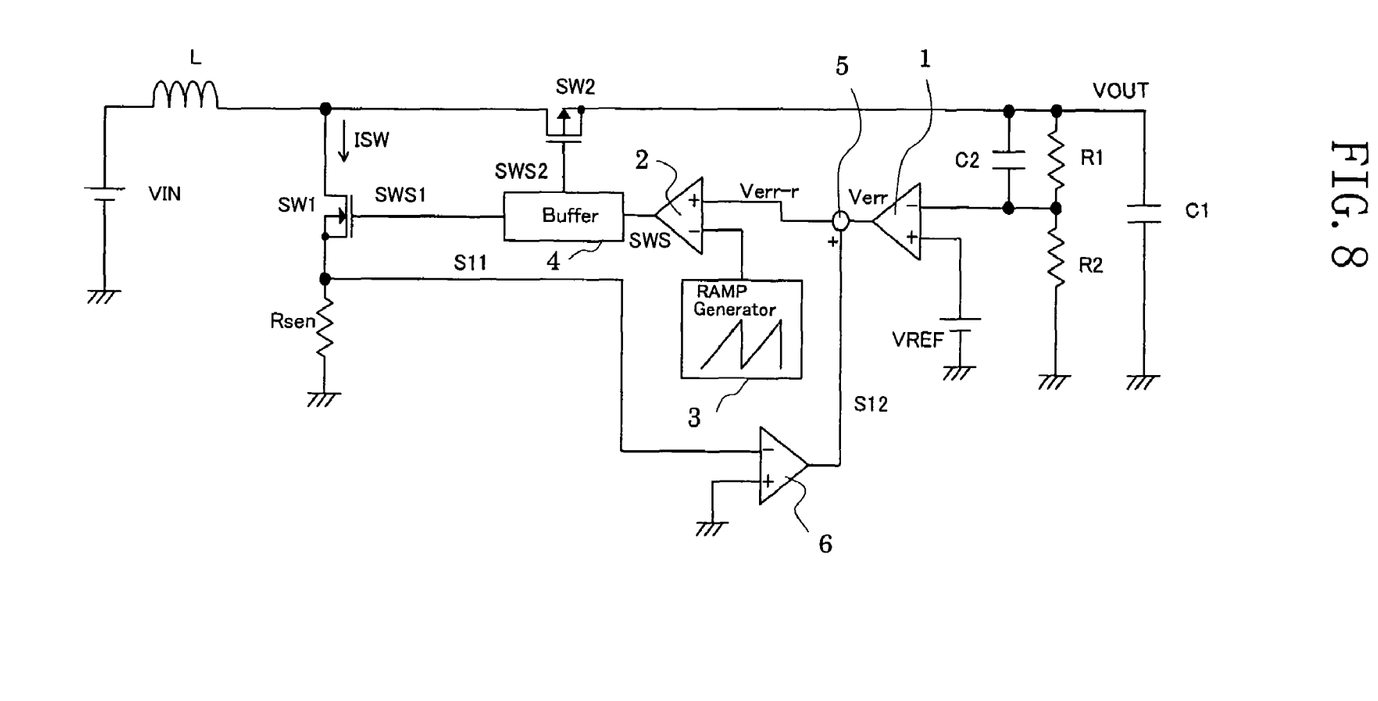
FIG. 8 is a circuit diagram showing a switching power supply circuit according to the earlier technology.

This type of switching power supply circuit according to an earlier technology is shown in FIG. 8. As shown in this drawing, the illustrated switching power supply circuit is a step-up switching power supply circuit for performing synchronous rectification. This switching power supply circuit has a switching means SW1 formed from an N-channel MOS transistor, a switching means SW2 formed from a P-channel MOS transistor, and an inductor L, designed to convert a direct current input voltage VIN into a predetermined direct current output voltage VOUT.

An error amplifier 1 outputs an error signal $V_{err}$ representing a differential voltage between a preset reference voltage VREF and a voltage obtained by dividing the direct current output voltage VOUT by resistances R1 and R2. A PWM comparator 2 compares the error signal $V_{err}$ with an oscillation signal RAMP outputted by an oscillation circuit 3, and exercises on/off control of the switching means SW1 to SW2 by a switching signal SWS of a predetermined duty determined based on the comparison. More concretely, a buffer circuit 4 forms switching signals SWS1 and SWS2, based on the switching signal SWS, so as to turn off the switching means SW2 during the ON-period of the switching means SW1, thereby turning the switching means SW1 and the switching means SW2 on and off alternately. That is, synchronous rectification is performed. In the drawing, C1 signifies an output capacitor, and C2 signifies a speed-up capacitor.

The above switching power supply circuit provides a current feedback system in order to stabilize control. That is, based on a current ISW flowing into the switching means SW1, a current information signal S11 is formed by utilization of a voltage at the point of connection between the switching means SW1 and a current detection resistance $R_{sen}$. The current information signal S11 is supplied to a differential amplifier 6 to obtain a current superposition signal S12, which is added to the aforementioned error signal $V_{err}$ (substantially, subtracted from the error signal $V_{err}$, because the sign of the current superposition signal S12 is minus) at a subtracter 5, whereby a new error signal $V_{err-r}$ is obtained. This error signal $V_{err-r}$ is compared with the oscillation signal RAMP by the PWM comparator 2.

The current information signal S11 is supplied to an inverting input terminal of the differential amplifier 6 having a non-inverting input terminal grounded.

Figure 9A:
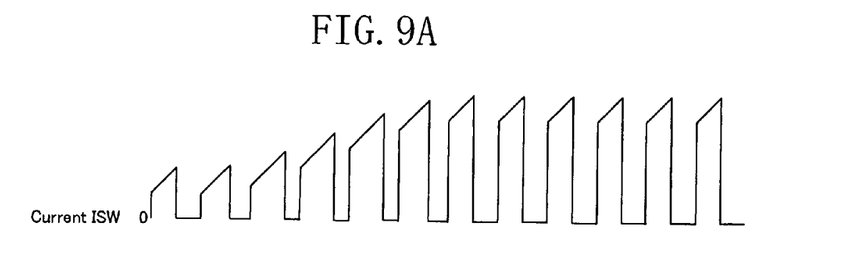
FIGS. 9A to 9D are waveform charts showing the waveforms of respective portions of the switching power supply circuit shown in FIG. 8.
Figure 9B:
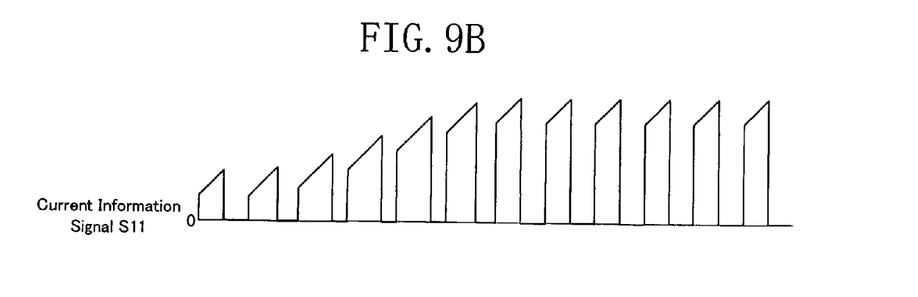
Figure 9C:
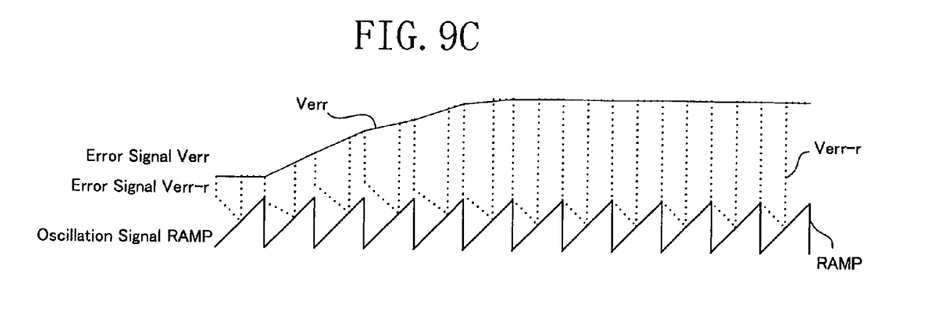
Figure 9D:
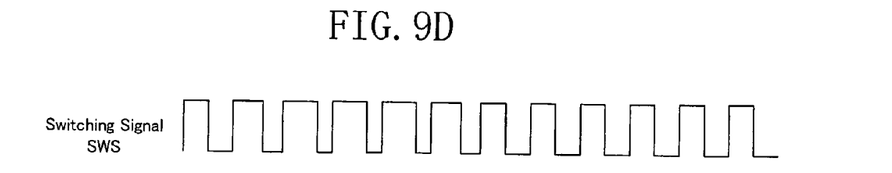

FIGS. 9A to 9D are waveform charts showing the waveforms of respective portions of the switching power supply circuit shown in FIG. 8. FIG. 9A shows the waveform of the current ISW, and FIG. 9B shows the waveform of the current information signal S11. FIG. 9C shows the waveforms of the error signal $V_{err}$, the new error signal $V_{err-r}$ (dotted line), which is the output signal of the subtracter 5, and the oscillation signal RAMP, and FIG. 9D shows the waveform of the switching signal SWS which is the output signal of the PWM comparator 2.

As will become clear by reference to FIGS. 9A to 9D (especially, FIG. 9C), in the switching power supply circuit according to the above-mentioned earlier technology, the current superposition signal S12 proportional to the current ISW flowing into the switching means SW1 is subtracted from the error signal $V_{err}$. If the current ISW increases or decreases, therefore, it is necessary to adjust the output of the error amplifier 1 in conformity with the action of the PWM comparator 2. As a result, the operating voltage of the error amplifier 1 increases, posing the problem of aggravating transient response characteristics.

Japanese Unexamined Patent Publication No. 2005-33936 can be named as a known patent document which discloses a switching power supply circuit having a current feedback system as mentioned above. The switching power supply circuit disclosed in this patent document samples current information at the turn-on of the switch each time switching takes place. However, this method involves the problem that the circuit is liable to instability, because feedback on a change in current occurring during a load change is impossible.

SUMMARY OF THE INVENTION

The present invention has been accomplished in the light of the above-described earlier technology. It is an object of the present invention to provide a switching power supply circuit capable of achieving the improvement of the operating voltage and the improvement of the transient response characteristics.

A first aspect of the present invention, for attaining the above object, is a switching power supply circuit having switching means and an inductor for converting a direct current input voltage into a direct current output voltage, comprising:

an error amplifier for outputting an error signal representing a differential voltage between a preset reference voltage and a voltage based on the direct current output voltage;

a PWM comparator for outputting a switching signal for on/off control of the switching means at a predetermined duty ratio determined by comparing the error signal with an oscillation signal outputted by an oscillation circuit;

current detection means for detecting a current flowing through the switching means or the inductor;

current holding means for holding the current flowing through the switching means or the inductor over a past predetermined period; and current superposition means for adding a current superposition signal to an output of, or an interior of, the error amplifier, the current superposition signal making an adjustment, based on a present current information signal which is an output signal of the current detection means, such that an ON-period of the switching signal of the PWM comparator is shortened, and also making an adjustment, based on a past current information signal which is an output signal of the current holding means, such that the ON-period of the switching signal of the PWM comparator is lengthened.

A second aspect of the present invention is the switching power supply circuit according to the first aspect, characterized in that the current detection means has a first resistance connected in series with the switching means or the inductor, and obtains the present current information signal by utilization of a voltage at a point of connection between the switching means or the inductor and the first resistance.

A third aspect of the present invention is the switching power supply circuit according to the second aspect, characterized in that the current detection means has the first resistance connected in series with the switching means or the inductor, current detection switching means branched off from the point of connection between the switching means or the inductor and the first resistance and connected to the point of connection, and a first capacitor connected in series with the current detection switching means, and obtains the present current information signal by utilization of a voltage at a point of connection between the current detection switching means and the first capacitor.

A fourth aspect of the present invention is the switching power supply circuit according to the first aspect, characterized in that the current detection means has current detection switching means connected to the switching means via an ON-resistance of the switching means, and has a first capacitor connected in series with the current detection switching means, and obtains the present current information signal by utilization of a voltage at a point of connection between the current detection switching means and the first capacitor which is based on a voltage drop due to the ON-resistance.

A fifth aspect of the present invention is the switching power supply circuit according to the third or fourth aspect, further comprising control means in order to hold the present current information signal when the switching means becomes OFF, the control means controlling the switching signal of the PWM comparator such that after the switching means is turned on by the switching signal, the current detection switching means is turned on, and before the switching means is turned off, the current detection switching means is turned off.

A sixth aspect of the present invention is the switching power supply circuit according to any one of the first to fifth aspects, characterized in that the current holding means has a second resistance and a second capacitor connected in series, delays the current information signal, which has been detected by the current detection means, based on a time constant, and outputs the delayed current information signal as the past current information signal via a point of connection between the second resistance and the second capacitor.

A seventh aspect of the present invention is the switching power supply circuit according to any one of the first to sixth aspects, characterized in that the current superposition means has a differential amplifier which has the past current information signal inputted into one of input terminals thereof, and which has the present current information signal inputted into the other input terminal, and adds an output signal of the differential amplifier, as the current superposition signal, to the output or the interior of the error amplifier.

According to the present invention, a current superposition signal is added to the output or the interior of the error amplifier, the current superposition signal making an adjustment, based on the present current information signal as the output signal of the current detection means, such that the ON-period of the switching signal of the PWM comparator is shortened, and also making an adjustment, based on the past current information signal as the output signal of the current holding means, such that the ON-period of the switching signal of the PWM comparator is lengthened. Thus, the operating voltage of the error amplifier can be kept low, and high speed, high accuracy detection of current can result in a high response of the switching power supply circuit.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

The embodiments of the present invention will now be described in detail with reference to the accompanying drawings. The basic configuration of a switching power supply circuit in each embodiment is the same as that of the switching power supply circuit shown in FIG. 8. Thus, the same portions as those in FIG. 8 are assigned the same numerals and symbols, and duplicate explanations are omitted.

First Embodiment

Figure 1:
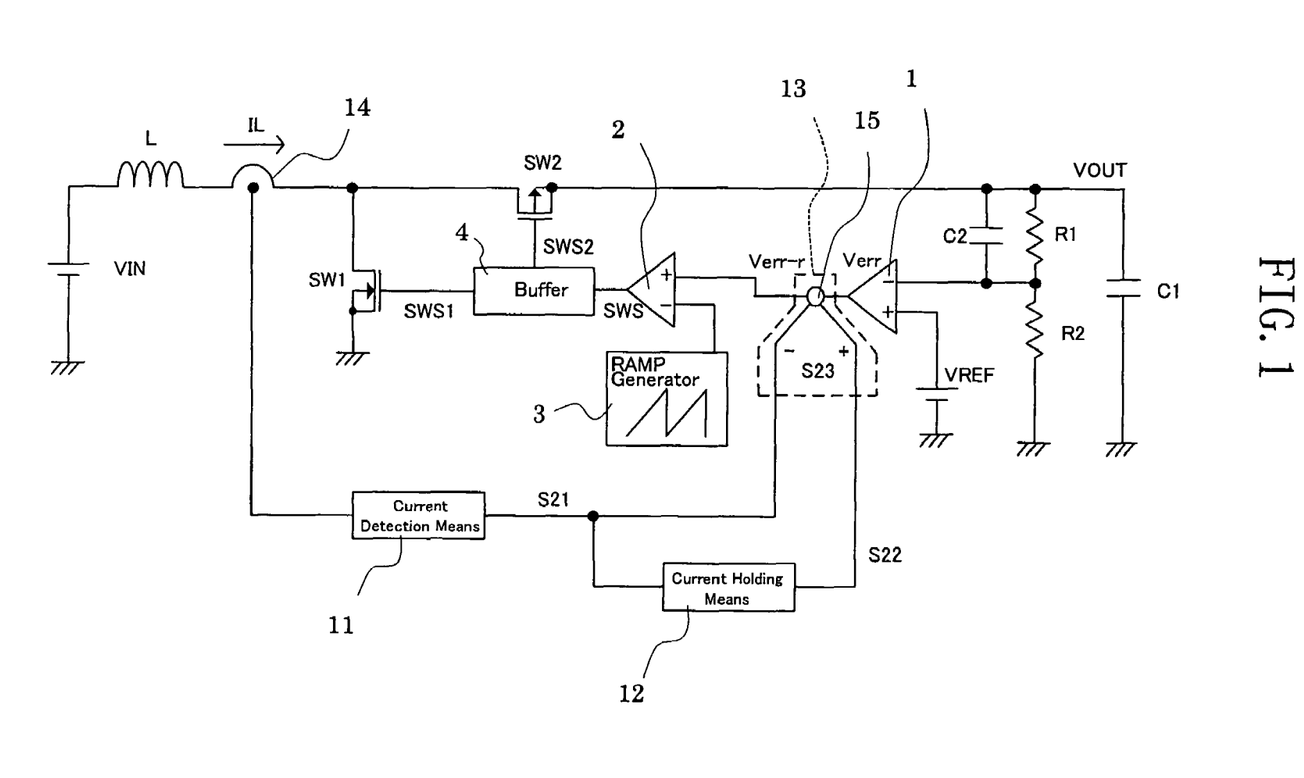
FIG. 1 is a circuit diagram showing a switching power supply circuit according to a first embodiment of the present invention.

FIG. 1 is a circuit diagram showing a switching power supply circuit according to a first embodiment of the present invention. As shown in this drawing, the switching power supply circuit according to the present embodiment has a current detection means 11, a current holding means 12, and a current superposition means 13 in a current feedback system.

The current detection means 11 detects a current IL, which flows through an inductor L, in real time via a current sensor 14, and outputs a present current information signal S21 representing this current IL. The current holding means 12 holds the current IL flowing over a past predetermined period, and outputs a past current information signal S22 based on the current IL during the predetermined period in the past. The current superposition means 13 has an adder-subtracter 15 accepting the current information signals S21 and S22 as inputs, subtracts the present current information signal S21 from an error signal $V_{err}$, which is the output signal of an error amplifier 1, and also adds the past current information signal S22 to the error signal $V_{err}$, to form a new error signal $V_{err\text{-}r}$, and then supplies this error signal $V_{err\text{-}r}$ to a PWM comparator 2. In this manner, the current information signal S21 is subtracted from the error signal $V_{err}$, whereby the ON-period of a switching signal SWS of the PWM comparator 2 can be adjusted to become shorter. Also, the current information signal S22 is added to the error signal $V_{err}$, whereby the ON-period of the switching signal SWS of the PWM comparator 2 can be adjusted to become longer.

According to the present embodiment described above, the current information signal S22, which is the output signal of the current holding means 12, becomes a signal delayed by a predetermined period with respect to the current information signal S21 which is the output signal of the current detection means 11. Thus, if a load change occurs in the switching power supply circuit to cause a change to the current flowing through the inductor L, the switching means SW1 and the switching means SW2, a great difference occurs between the current information signals S21 and S22 to suppress a change in the error signal $V_{err}$ which is the output of the error amplifier 1.

In this manner, the stabilization of the switching power supply circuit can be achieved. If a steady state is attained thereafter, the difference between the current information signals S21 and S22 is diminished. As a result; the error signal $V_{err}$ becomes equal to the same state as that before the transient response, thereby making it possible to decrease the operating range of the error amplifier 1.

Second Embodiment

Figure 2:
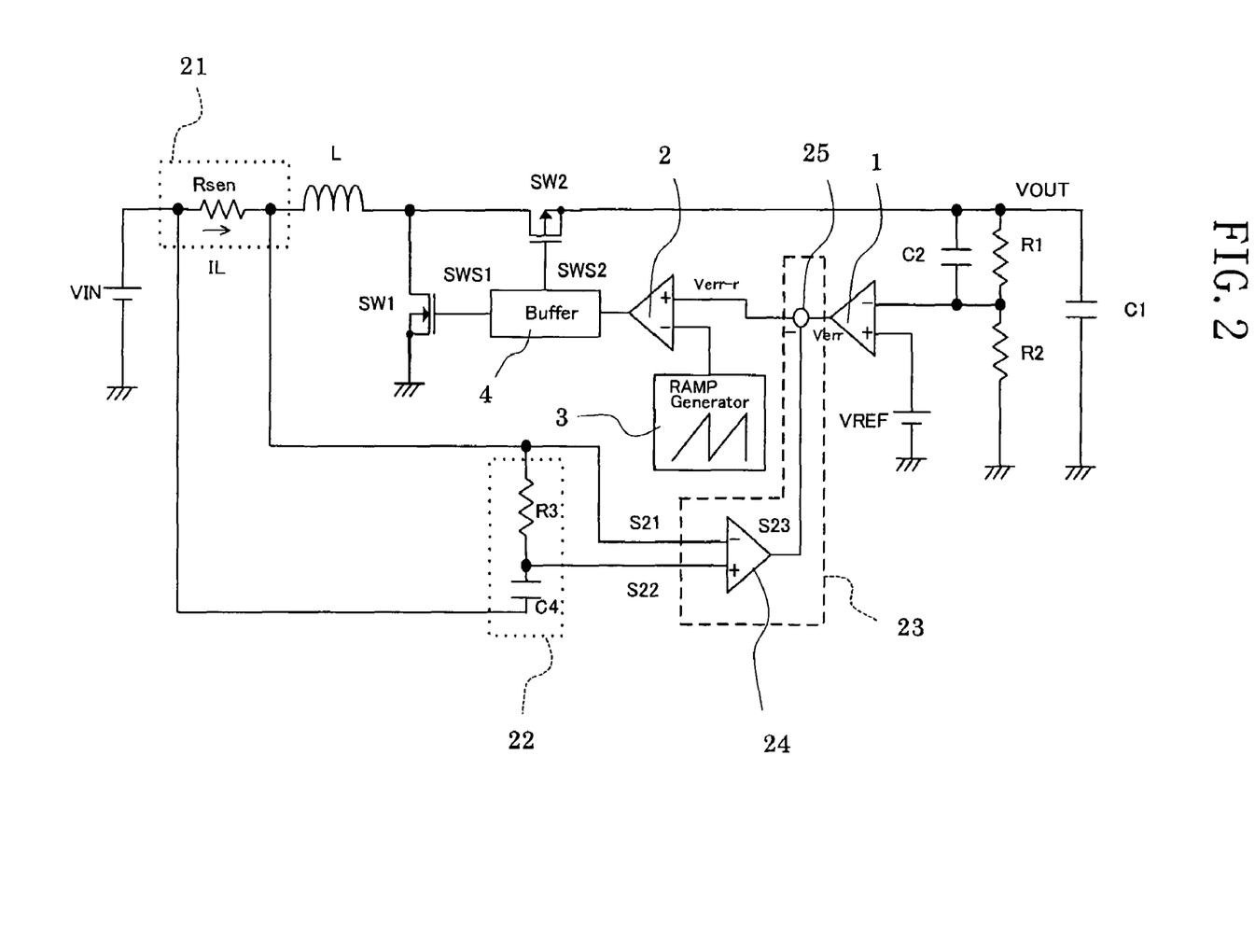
FIG. 2 is a circuit diagram showing a switching power supply circuit according to a second embodiment of the present invention.

FIG. 2 is a circuit diagram showing a switching power supply circuit according to a second embodiment of the present invention. As shown in this drawing, a current detection means 21 has a resistance $R_{sen}$ connected in series with an inductor L, and obtains a present current information signal S21 by utilization of a voltage at the point of connection between the inductor L and the resistance $R_{sen}$.

A current holding means 22 has a resistance R3 and a capacitor C4 connected in series, and delays the current information signal S21, which has been detected by the current detection means 21, based on a time constant determined by the resistance value of the resistance R3 and the capacity of the capacitor C4. As a result, a past current information signal S22 is obtained via the point of connection between the resistance R3 and the capacitor C4.

A current superposition means 23 has a differential amplifier 24 and an adder 25. The differential amplifier 24 has the present current information signal S21 received into its inverting input terminal, and has the past current information signal S22 received into its non-inverting input terminal. The adder 25 receives, as an input, a current superposition signal S23 which is the output signal of the differential amplifier 24. As a result, the current superposition signal S23 is superposed on an error signal $V_{err}$, which is the output signal of an error amplifier 1, to form a new error signal $V_{err\text{-}r}$, which is outputted to a PWM comparator 2.

The current superposition signal S23 is obtained, at the differential amplifier 24, as a signal produced by subtracting the current information signal S21 from the current information signal S22. Thus, the current superposition signal S23 makes adjustments such that the ON-period of a switching signal SWS of the PWN comparator 2 is shortened based on the present current information signal S21, and the ON-period of the switching signal SWS is lengthened based on the past current information signal S22.

According to the present embodiment, the object of the present invention can be attained by a very simple circuit configuration having the resistances and the capacitor added to the earlier technology.

Third Embodiment

Figure 3:
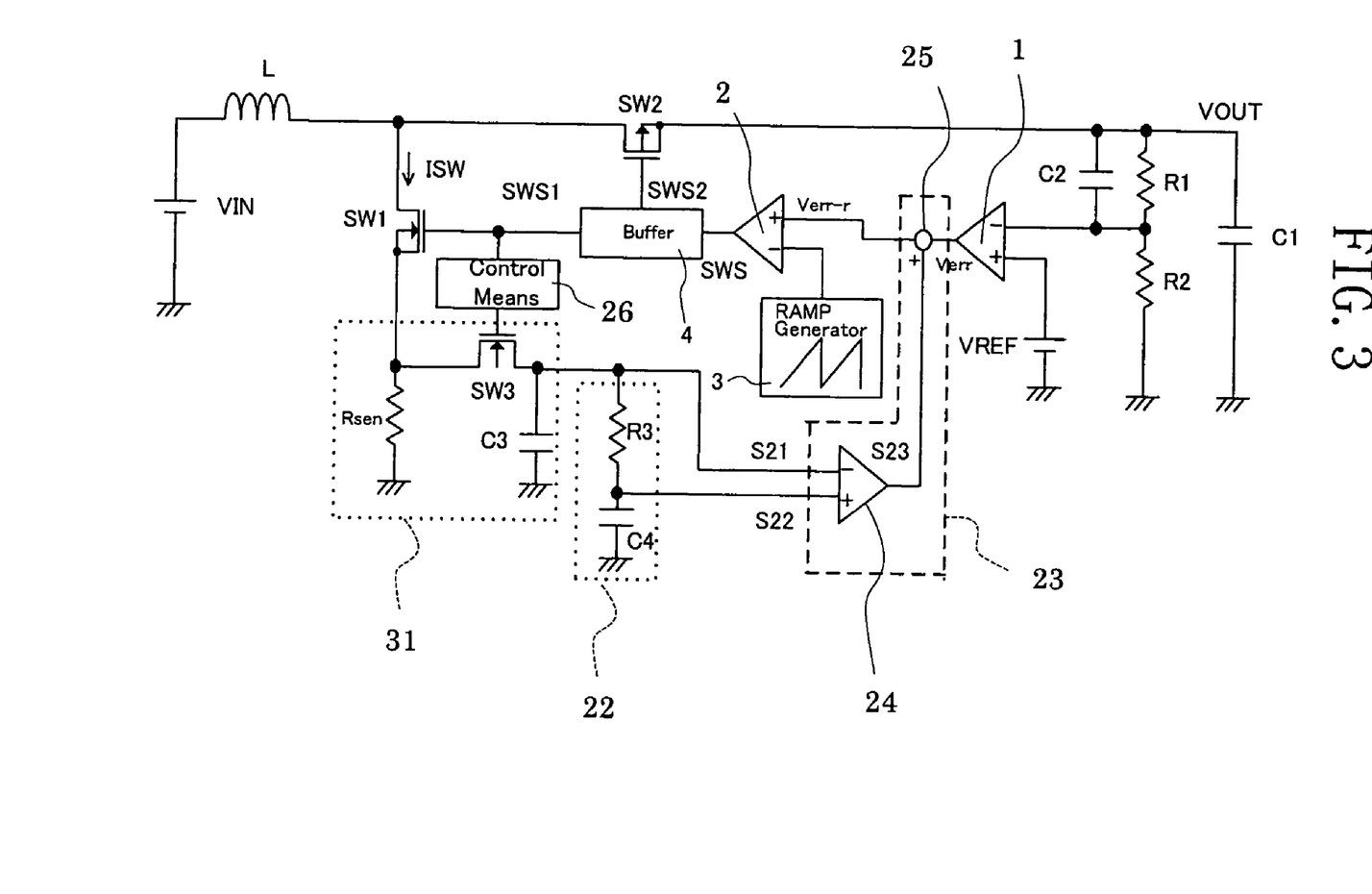
FIG. 3 is a circuit diagram showing a switching power supply circuit according to a third embodiment of the present invention.

FIG. 3 is a circuit diagram showing a switching power supply circuit according to a third embodiment of the present invention. As shown in this drawing, a current detection means 31 has a resistance $R_{sen}$ connected in series with a switching means SW1, a current detection switching means SW3 branched off from the point of connection between the switching means SW1 and the resistance $R_{sen}$ and connected to this point of connection, and a first capacitor C3 connected in series with the current detection switching means SW3. A present current information signal S21 is obtained by utilization of a voltage at the point of connection between the current detection switching means SW3 and the capacitor C3. The current detection switching means SW3 is composed of an N-channel MOS transistor, and is turned on by a switching signal SWS1 which is the output signal of a buffer circuit 4 and which is supplied to the gate of the current detection switching means SW3. The switching signal SWS1 is simultaneously supplied to the gate of the switching means SW1 which is an N-channel MOS transistor like the current detection switching means SW3.

The switching signal SWS1 is supplied to the gate of the current detection switching means SW3 via a control means 26. The control means 26 controls the switching signal SWS1 such that after the switching means SW1 is turned on by the switching signal SWS1, the current detection switching means SW3 is turned on, and before the switching means SW1 is turned off, the current detection switching means SW3 is turned off. Thus, when the switching means SW1 is turned off, the present current information signal S21 can be held.

A current holding means 22 has a resistance R3 and a capacitor C4 connected in series, and delays the current information signal S21, which has been detected by the current detection means 31, based on a time constant determined by the resistance value of the resistance R3 and the capacity of the capacitor C4. As a result, a past current information signal S22 is obtained via the point of connection between the resistance R3 and the capacitor C4.

A current superposition means 23 has a differential amplifier 24 and an adder 25. The differential amplifier 24 has the present current information signal S21 inputted into its inverting input terminal, and has the past current information signal S22 inputted into its non-inverting input terminal. The adder 25 receives, as an input, a current superposition signal S23 which is the output signal of the differential amplifier 24. As a result, the current superposition signal S23 is superposed on an error signal $V_{err}$, which is the output signal of an error amplifier 1, to form a new error signal $V_{err\text{-}r}$, which is outputted to a PWM comparator 2.

The current superposition signal S23 is obtained, at the differential amplifier 24, as a signal produced upon subtraction of the current information signal S21 from the current information signal S22. Thus, the current superposition signal S23 is adjusted such that the ON-period of a switching signal SWS of the PWN comparator 2 is shortened based on the present current information signal S21, and the ON-period of the switching signal SWS is lengthened based on the past current information signal S22.

Figure 4A:
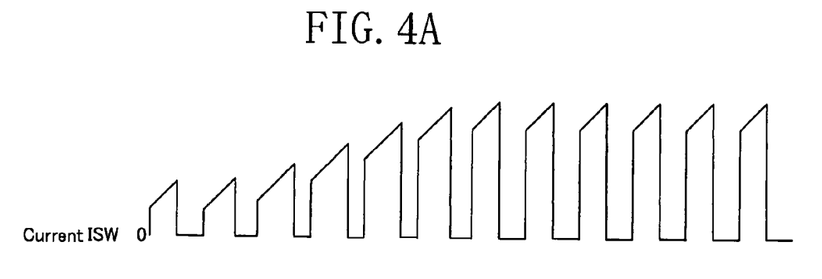
FIGS. 4A to 4D are waveform charts showing the waveforms of respective portions of the switching power supply circuit shown in FIG. 3.
Figure 4B:
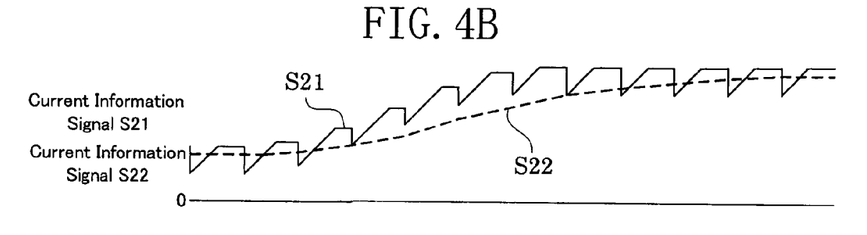
Figure 4C:
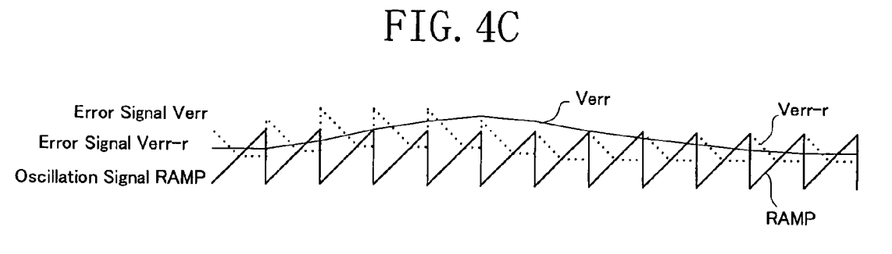
Figure 4D:
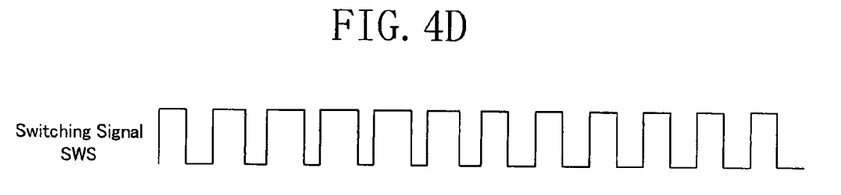

FIGS. 4A to 4D are waveform charts showing the waveforms of respective portions of the switching power supply circuit according to the present embodiment. FIG. 4A shows the waveform of a current ISW, and FIG. 4B shows the waveform of the present current information signal S21 (solid line) and the waveform of the past current information signal S22 (dashed line). FIG. 4C shows the waveforms of the error signal $V_{err}$, the new error signal $V_{err-r}$ (dotted line), which is the output signal of the adder 25, and an oscillation signal RAMP. FIG. 4D shows the waveform of the switching signal SWS which is the output signal of the PWM comparator 2.

As will become clear by reference to FIGS. 4A to 4D (especially, FIGS. 4B and 4C), in the switching power supply circuit according to the present embodiment, the current information signal S22 is a signal delayed by a predetermined period with respect to the current information signal S21. Furthermore, the current superposition signal S23, which represents a difference produced upon subtraction of the present current information signal S21 from the past current information signal S22, is supplied to the adder 25. Thus, a change in the error signal $V_{err}$ can be suppressed.

Fourth Embodiment

Figure 5:
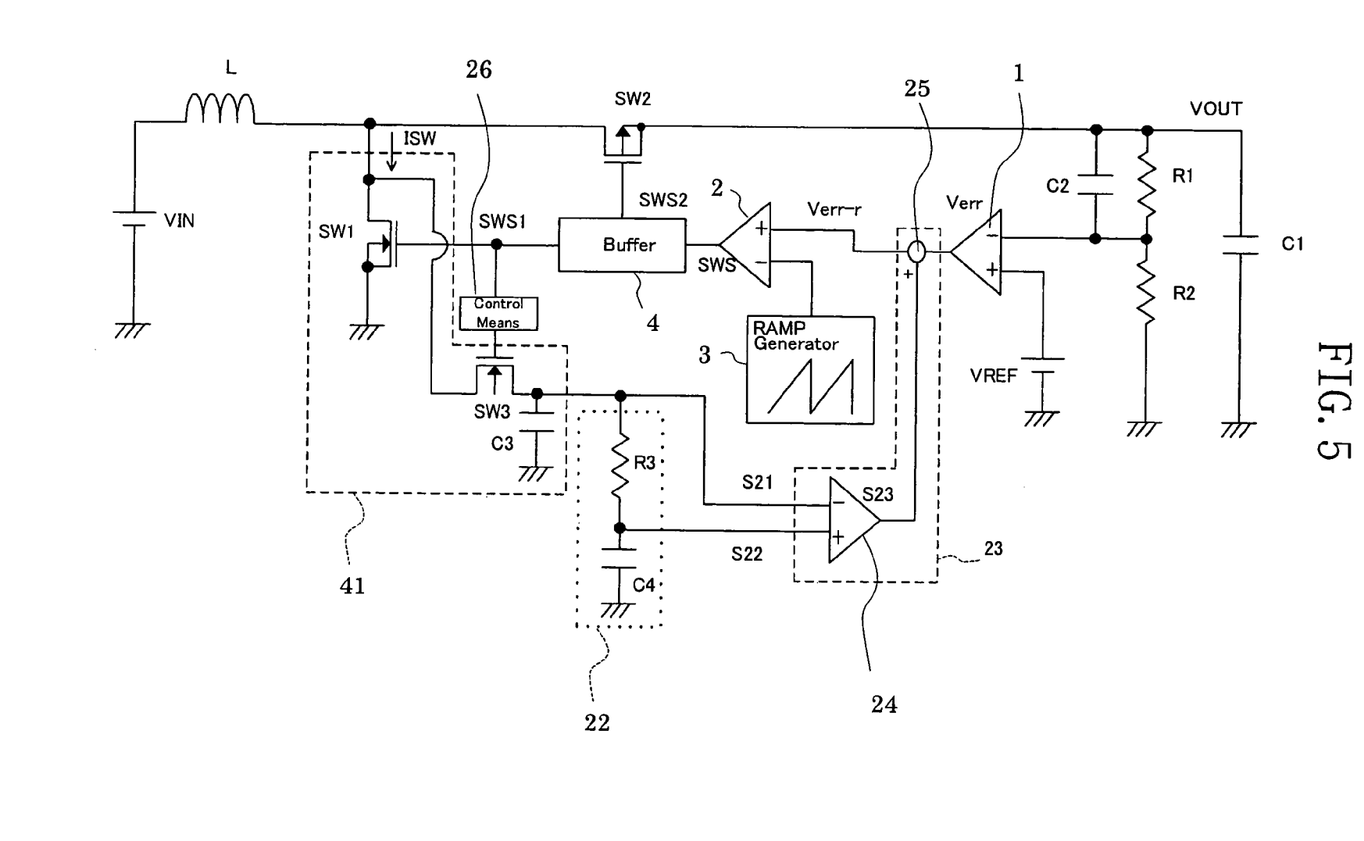
FIG. 5 is a circuit diagram showing a switching power supply circuit according to a fourth embodiment of the present invention.

FIG. 5 is a circuit diagram showing a switching power supply circuit according to a fourth embodiment of the present invention. As shown in this drawing, the present embodiment is a variation of the configuration of the current detection means 31 according to the third embodiment. The other features in the present embodiment are exactly the same as those in the third embodiment. Thus, the same portions as those in FIG. 3 are assigned the same numerals and symbols, and duplicate explanations are omitted.

A current detection means 41 according to the present embodiment has a current detection switching means SW3 connected to a switching means SW1, which is an N-channel MOS transistor, via the ON-resistance of the switching means SW1, and has a capacitor C3 connected in series with the current detection switching means SW3. The current detection means 41 obtains a present current information signal S21 by utilization of a voltage at the point of connection between the current detection switching means SW3 and the capacitor C3 which is based on a voltage drop due to the ON-resistance. That is, the drain of the current detection switching means SW3, which is an N-channel MOS transistor, is connected to the drain of the switching means SW1 which is similarly the N-channel MOS transistor. According to the present embodiment, therefore, the current detection resistance $R_{sen}$ in FIG. 3 can be omitted, thus contributing to the downsizing of the switching power supply circuit.

A switching signal SWS1 is supplied to the gate of the current detection switching means SW3 via a control means 26, as in the third embodiment shown in FIG. 3. The control means 26 controls the switching signal SWS1 such that after the switching means SW1 is turned on by the switching signal SWS1, the current detection switching means SW3 is turned on, and before the switching means SW1 is turned off, the current detection switching means SW3 is turned off. Thus, when the switching means SW1 is turned off, the present current information signal S21 can be held.

Other Embodiments

Figure 6:
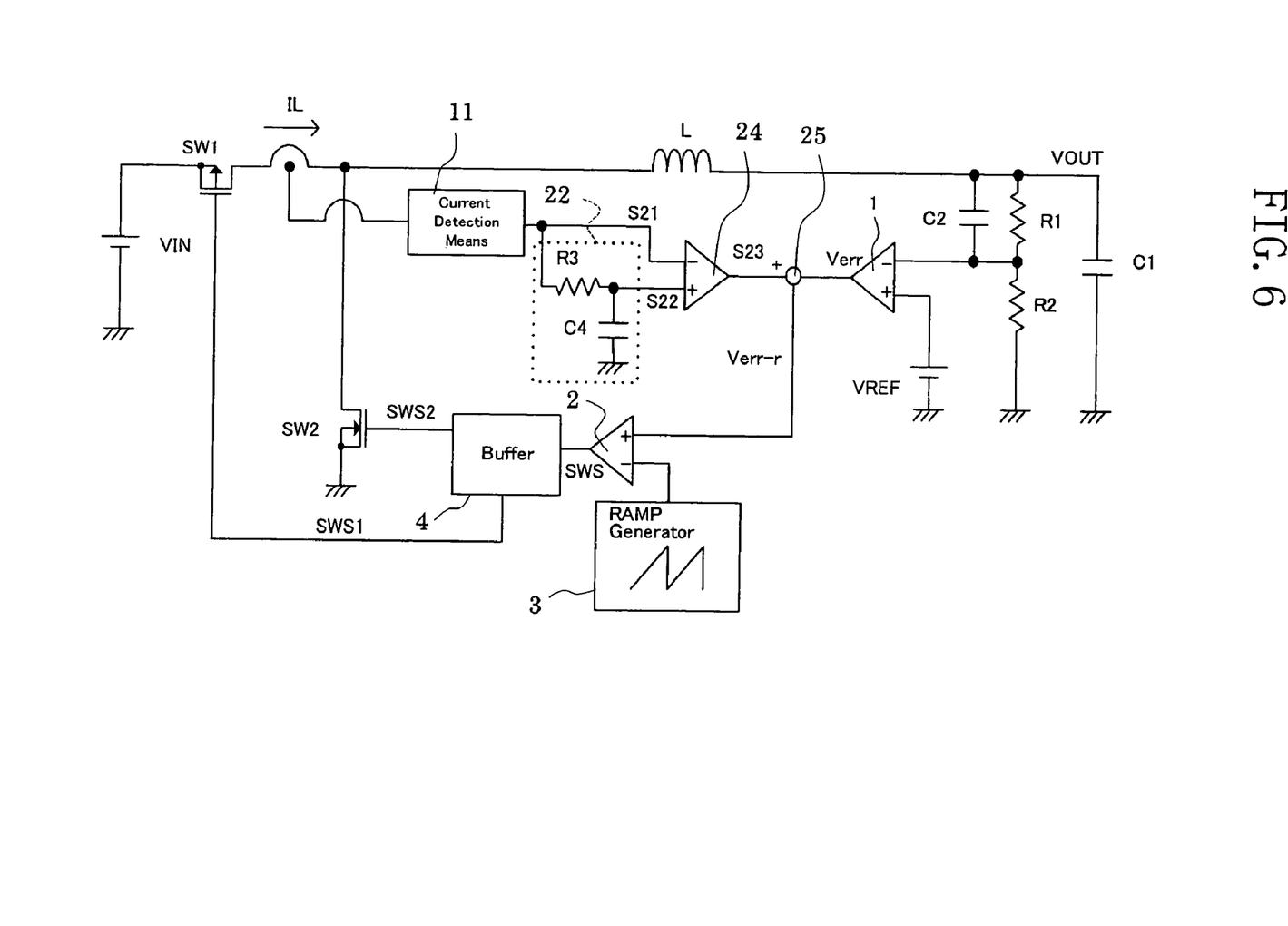
FIG. 6 is a circuit diagram showing a first example of a step-down switching power supply circuit according to an embodiment of the present invention.
Figure 7:
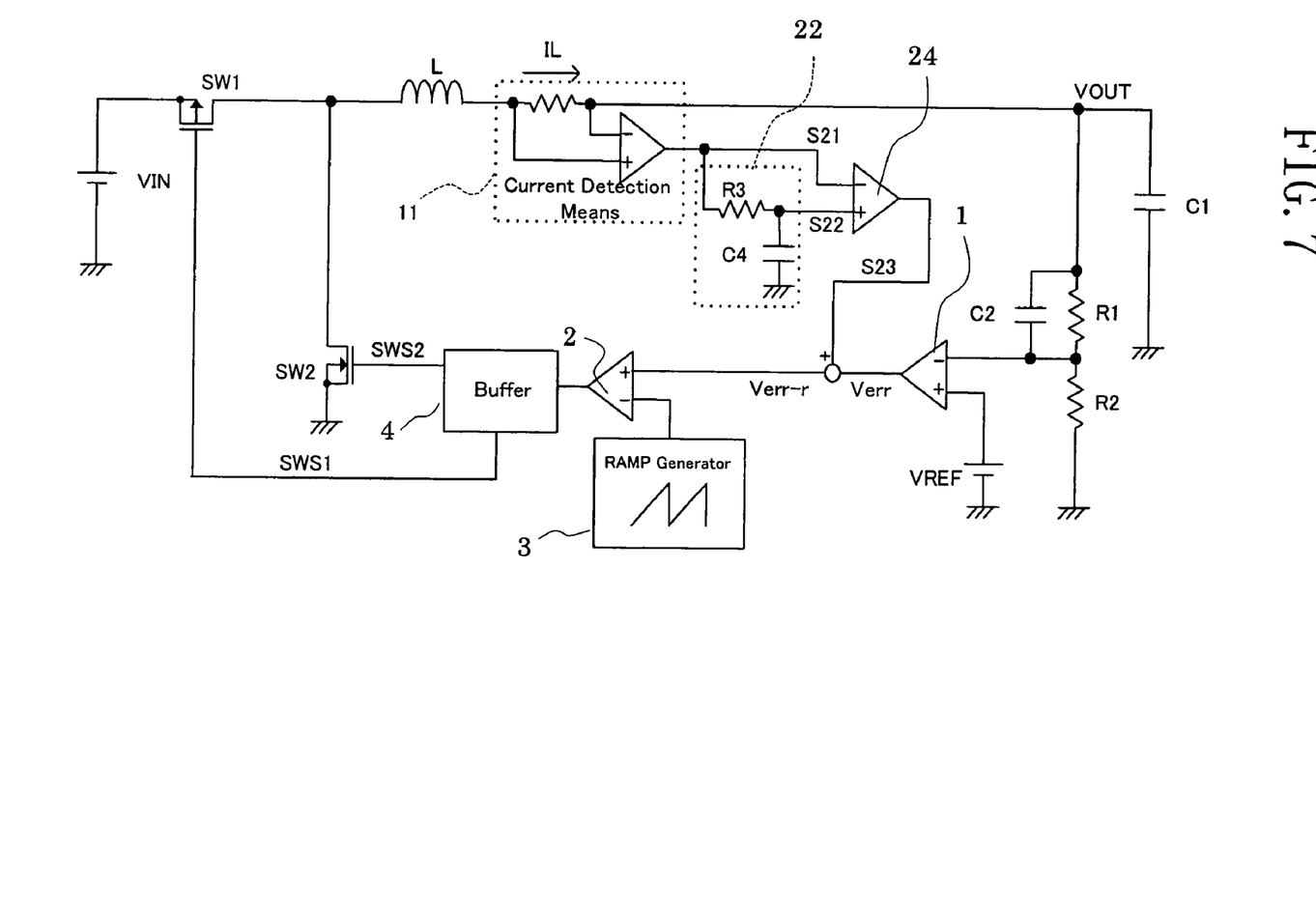
FIG. 7 is a circuit diagram showing a second example of a step-down switching power supply circuit according to an embodiment of the present invention.

The first to fourth embodiments described above are all step-up switching power supply circuits, but needless to say, step-down switching power supply circuits can be formed based on the same technical ideas as described there. FIGS. 6 and 7 show step-down switching power supply circuits according to embodiments of the present invention. In FIGS. 6 and 7, portions functionally corresponding to the portions in FIGS. 1 to 5 are assigned the same numerals and symbols as in these drawings, and duplicate explanations are omitted.

The present invention can be used, for example, in the industrial field of electronic equipment where a switching power supply circuit for forming a power supply circuit in a cellular phone or a personal computer is produced and marketed.

Although the present invention has been described by the above embodiments, it should be understood that the invention is not limited to these embodiments, but may be varied in many ways as indicated below.

The present current information signal S21 in each of the above-described embodiments is formed by utilization of the current IL flowing through the inductor L, or the current ISW flowing through the switching means SW1, but can be formed by utilization of a current flowing through the switching means SW2. Furthermore, besides the current IL flowing into the inductor L, the current flowing through the drain side or source side of the switching means SW1, or the drain side or source side of the switching means SW2 can be similarly utilized.

Moreover, the current superposition signal S23 is superposed on the error signal $V_{err}$ via the adder-subtracter 15 or the adder 25. However, the current superposition signal S23 may be directly supplied into the error amplifier 1, and superposed there.

Besides, an offset may be provided such that the influence on the switching signal SWS based on the present current information signal S21 is greater than the influence on the switching signal SWS based on the past current information signal S22. Various methods of creating a concrete offset can be conceived by selecting, as appropriate, the specifications for the circuit elements, such as the sizes and resistance values of the respective transistors. For example, this can be done by applying an offset voltage to the differential amplifier 24 to render the present current information signal S21 greater than the past current information signal S22.

If such an offset is provided, the degree of fall in the error signal $V_{err}$ shown in FIG. 4C can be adjusted.

Each of the embodiments of the present invention comprises a combination of one of the current detection means 11, 21, 31 and 41, one of the current holding means 12 and 22, and one of the current superposition means 13 and 23. However, such a combination is not restrictive, and any of these means can be combined freely.

Such changes, substitutions and alterations can be made in the present invention without departing from the spirit and scope of the invention as defined by the appended claims.

What is claimed is:

1. A switching power supply circuit having switching means and an inductor for converting a direct current input voltage into a direct current output voltage, comprising:
    an error amplifier for outputting an error signal representing a differential voltage between a preset reference voltage and a voltage based on the direct current output voltage;
    a PWM comparator for outputting a switching signal for on/off control of the switching means at a predetermined duty ratio determined by comparing the error signal with an oscillation signal outputted by an oscillation circuit;
    current detection means for detecting a current flowing through the switching means or the inductor;
    current holding means for holding the current flowing through the switching means or the inductor over a past predetermined period; and current superposition means for adding a current superposition signal to an output of, or an interior of, the error amplifier, the current superposition signal making an adjustment, based on a present current information signal which is an output signal of the current detection means, such that an ON-period of the switching signal of the PWM comparator is shortened, and also making an adjustment, based on a past current information signal which is an output signal of the current holding means, such that the ON-period of the switching signal of the PWM comparator is lengthened.

2. The switching power supply circuit according to claim 1, wherein
the current detection means has a first resistance connected in series with the switching means or the inductor, and obtains the present current information signal by utilization of a voltage at a point of connection between the switching means or the inductor and the first resistance.

3. The switching power supply circuit according to claim 2, wherein
the current detection means
has the first resistance connected in series with the switching means or the inductor, current detection switching means branched off from the point of connection between the switching means or the inductor and the first resistance and connected to the point of connection, and a first capacitor connected in series with the current detection switching means, and
obtains the present current information signal by utilization of a voltage at a point of connection detetection switching means is turned off. between the current detection switching means and the first capacitor.

4. The switching power supply circuit according to claim 1, wherein
the current detection means
has current detection switching means connected to the switching means via an ON-resistance of the switching means, and has a first capacitor connected in series with the current detection switching means, and
obtains the present current information signal by utilization of a voltage at a point of connection between the current detection switching means and the first capacitor which is based on a voltage drop due to the ON-resistance.

5. The switching power supply circuit according to claim 3, further comprising
control means in order to hold the present current information signal when the switching means becomes OFF,
the control means controlling the switching signal of the PWM comparator such that after the switching means is turned on by the switching signal, the current detection switching means is turned on, and before the switching means is turned off, the current detection switching means is turned off.

6. The switching power supply circuit according to claim 4, further comprising
control means in order to hold the present current information signal when the switching means becomes OFF,
the control means controlling the switching signal of the PWM comparator such that after the switching means is turned on by the switching signal, the current detection switching means is turned on, and before the switching means is turned off, the current detection switching means is turned off.

7. The switching power supply circuit according to claim 1, wherein
the current holding means
has a second resistance and a second capacitor connected in series,
delays the current information signal, which has been detected by the current detection means, based on a time constant, and
outputs the delayed current information signal as the past current information signal via a point of connection between the second resistance and the second capacitor.

8. The switching power supply circuit according to claim 1, wherein
the current superposition means
has a differential amplifier which has the past current information signal inputted into one of input terminals thereof, and which has the present current information signal inputted into the other input terminal, and
adds an output signal of the differential amplifier, as the current superposition signal, to the output or the interior of the error amplifier.

* * * * *

UNITED STATES PATENT AND TRADEMARK OFFICE
CERTIFICATE OF CORRECTION

PATENT NO.         : 7,545,129 B2                                    Page 1 of 1
APPLICATION NO.    : 11/810390
DATED              : June 9, 2009
INVENTOR(S)        : Hane et al.

It is certified that error appears in the above-identified patent and that said Letters Patent is hereby corrected as shown below:

Column 9, Lines 29-32 of Claim 3:

"obtains the present current information signal by utilization of a voltage at a point of connection detection switching means is turned off. between the current detection switching means and the first capacitor."

should read

-- obtains the present current information signal by utilization of a voltage at a point of connection between the current detection switching means and the first capacitor. --

Signed and Sealed this

Twenty-second Day of September, 2009

David J. Kappos
*Director of the United States Patent and Trademark Office*